(12) United States Patent
Steiner (10) Patent No.: US 9,288,920 B1
(45) Date of Patent: Mar. 15, 2016

(54) ELECTRONIC DEVICE HOLDER

(71) Applicant: Robert W. Steiner, Burke, VA (US)

(72) Inventor: Robert W. Steiner, Burke, VA (US)

( * ) Notice: Subject to any disclaimer, the term of this patent is extended or adjusted under 35 U.S.C. 154(b) by 0 days.

(21) Appl. No.: 14/679,100

(22) Filed: Apr. 6, 2015

(51) Int. Cl.
*F16L 3/00* (2006.01)
*H05K 5/02* (2006.01)
*F16M 11/38* (2006.01)
*B25J 1/04* (2006.01)

(52) U.S. Cl.
CPC ............... *H05K 5/0204* (2013.01); *B25J 1/04* (2013.01); *F16M 11/38* (2013.01)

(58) Field of Classification Search
CPC .......... H05K 5/0204; F16M 11/38; B25J 1/04
USPC .......... 248/473, 488, 917, 918, 919; 294/137, 294/142, 165, 169
See application file for complete search history.

(56) References Cited

U.S. PATENT DOCUMENTS

| | | | |
|---|---|---|---|
| 7,390,130 B2 | 6/2008 | Soulvie | |
| 7,422,379 B2 | 9/2008 | Agevik et al. | |
| 7,611,112 B2 * | 11/2009 | Lin | 248/274.1 |
| 8,007,188 B2 | 8/2011 | Orf | |
| 8,287,194 B2 | 10/2012 | Orf | |
| 8,568,041 B2 | 10/2013 | Cherubin | |
| 8,638,557 B2 | 1/2014 | Tsai | |
| 2011/0019992 A1 | 1/2011 | Orf | |
| 2011/0069947 A1 | 3/2011 | Orf | |
| 2011/0164173 A1 | 7/2011 | Orf | |
| 2012/0024918 A1 * | 2/2012 | DeCamp et al. | 224/267 |
| 2013/0094846 A1 | 4/2013 | Apter | |
| 2013/0161967 A1 * | 6/2013 | Jarrett et al. | 294/142 |
| 2013/0168514 A1 | 7/2013 | Woolford | |
| 2013/0175413 A1 * | 7/2013 | Waugh | 248/124.1 |
| 2013/0188943 A1 | 7/2013 | Wu | |
| 2013/0206935 A1 * | 8/2013 | Majid et al. | 248/124.1 |
| 2013/0243231 A1 * | 9/2013 | Parraga Gimeno | 381/332 |
| 2013/0249227 A1 * | 9/2013 | Lin | 294/142 |
| 2013/0270850 A1 * | 10/2013 | Fan | 294/137 |
| 2013/0277520 A1 | 10/2013 | Funk et al. | |
| 2014/0001324 A1 | 1/2014 | Bowles | |

* cited by examiner

*Primary Examiner* — Gwendolyn Baxter
(74) *Attorney, Agent, or Firm* — Brian J. Teague (57) ABSTRACT

An electronic device holder comprises an elongated main body, a handle affixed to the main body, and a U-shaped bracket for holding an electronic device. The bracket is slidably and rotatably engaged with the main body such that the bracket is selectively slidable along at least a portion of a length of the main body and such that the bracket is selectively rotatable at least between a first position that is parallel to the main body and a second position that is perpendicular to the main body.

41 Claims, 11 Drawing Sheets

ELECTRONIC DEVICE HOLDER

FIELD OF THE INVENTION

The present invention relates generally to devices for holding an electronic device, such as a smartphone or tablet computer.

BACKGROUND OF THE DISCLOSURE

Mobile electronic devices, such as smartphones and tablet computers, are increasingly used for taking photographs and videos. Such mobile electronic devices can be difficult to hold properly for photographs and videos, especially when it is necessary to hold the mobile electronic device above an obstruction (e.g., people in front of you) when taking photographs and videos.

BRIEF SUMMARY OF THE DISCLOSURE

In one embodiment of the invention, an electronic device holder comprises an elongated main body, a handle affixed to the main body, and a U-shaped bracket for holding an electronic device. The bracket is slidably and rotatably engaged with the main body such that the bracket is selectively slidable along at least a portion of a length of the main body and such that the bracket is selectively rotatable at least between a first position that is parallel to the main body and a second position that is perpendicular to the main body.

The handle may be affixed to the main body adjacent one end of the main body. The handle may be hingedly affixed to the main body, such that the handle may be selectively movable between an open position and a closed position. The holder may further comprise a latch to retain the handle in the open position and/or in the closed position.

The bracket may comprise a lower portion having first and second ends and two arms, each arm being affixed to a respective one of the first and second ends. Each arm may be hingedly affixed to a respective one of the first and second ends. Each arm may be U-shaped with an open side, and the open side of each arm may face the open side of the other arm. The arms may be selectively movable linearly in and out along a longitudinal axis of the lower portion of the bracket. The arms may be biased inward along the longitudinal axis of the lower portion of the bracket.

The bracket may further comprise a projection on a bottom surface of the lower portion, the projection having a female threaded opening defined in a lower surface thereof.

A top elongated open channel may be defined in a top surface of the main body, such that the projection on the bottom surface of the lower portion of the bracket selectively slidably engages with the top channel.

The holder may further comprise a thumbscrew having a body and a male threaded projection from the main body. A side elongated through-channel may be defined in the main body and extend from a first side of the main body to an opposing second side of the main body. The top channel and the side through-channel may be at least partially open to each other. The thumbscrew may be at least partially positioned in the side through-channel such that portions of the thumbscrew body project respectively out of opposing sides of the side through-channel and at least a portion of the male threaded projection projects out of the top channel. The male threaded projection of the thumbscrew may selectively threadedly engage the female threaded opening of the projection of the bracket when the projection of the bracket engages with the top channel. Tightening the threaded engagement between the male threaded projection of the thumbscrew and the female threaded opening of the projection of the bracket may restrict movement of the bracket relative to the main body.

The female threaded opening of the projection of the bracket may be selectively threadedly engageable with a standard male threaded tripod screw adapter.

The bracket may further comprise one or more kickstands selectively movable between an open position and a closed position, such that the one or more kickstands supports the bracket in an upright but angled position when the bracket is removed from the holder and when the one or more kickstands is in the open position.

In addition to the electronic device holder, as described above, other aspects of the present invention are directed to corresponding methods for holding an electronic device.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings.

DETAILED DESCRIPTION OF THE DISCLOSURE

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of the invention are directed to a device for holding an electronic device. The holder of embodiments of the invention enables a user to easily and steadily hold a generally planar electronic device, such as a smartphone or tablet computer, at an extended distance from the user's body.

Figure 1:
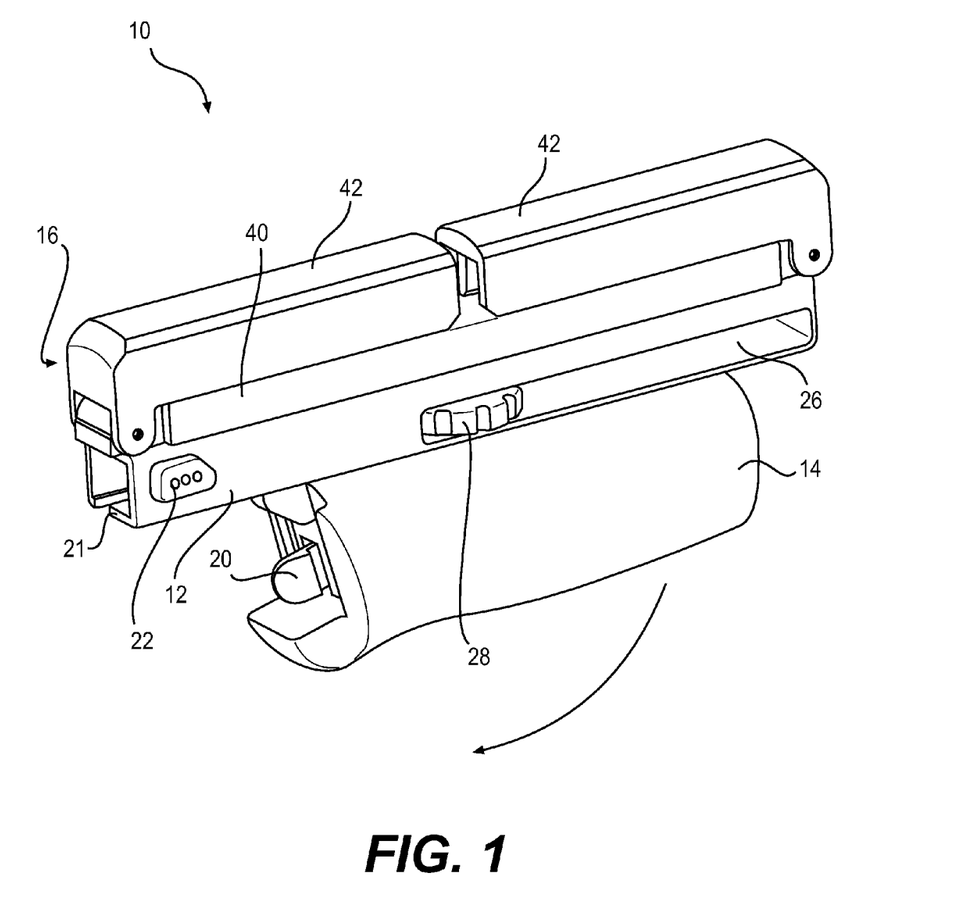
FIG. 1 is a perspective view of an electronic device holder, in a fully closed position, in accordance with embodiments of the present invention.
Figure 2:
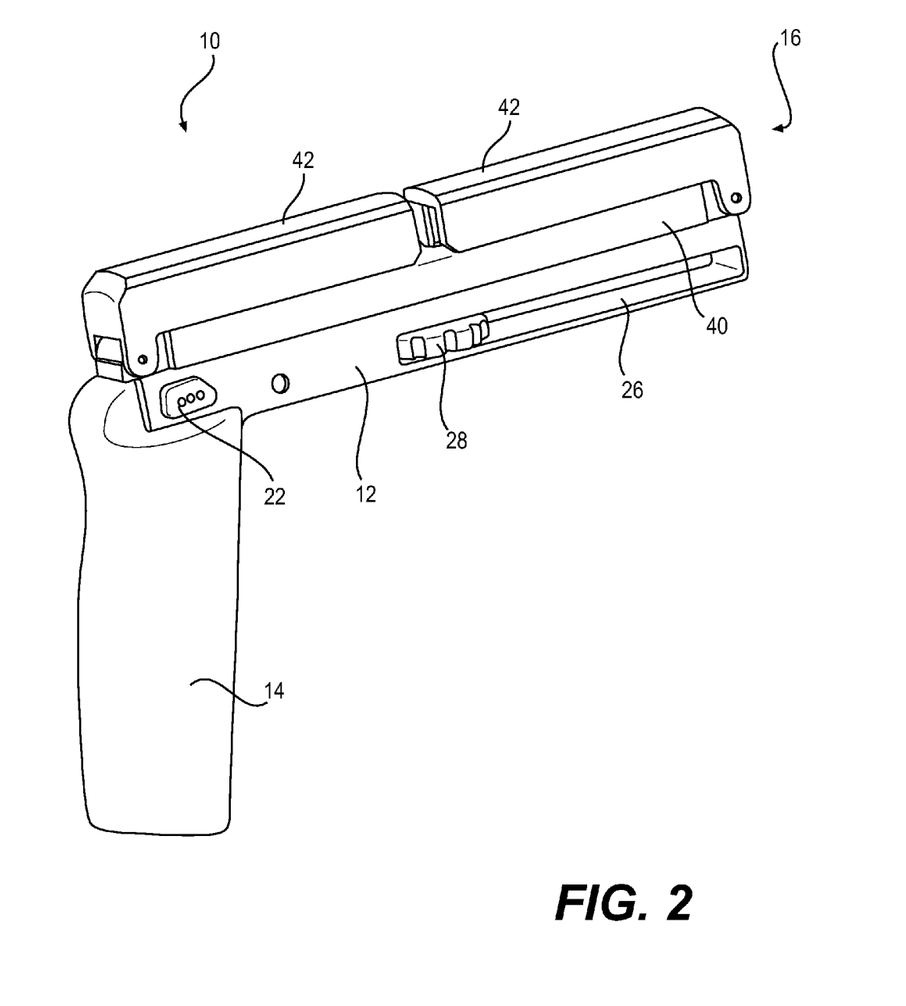
FIG. 2 is a perspective view of the holder of FIG. 1, from a different side, showing the holder with the handle in the open position.
Figure 3:
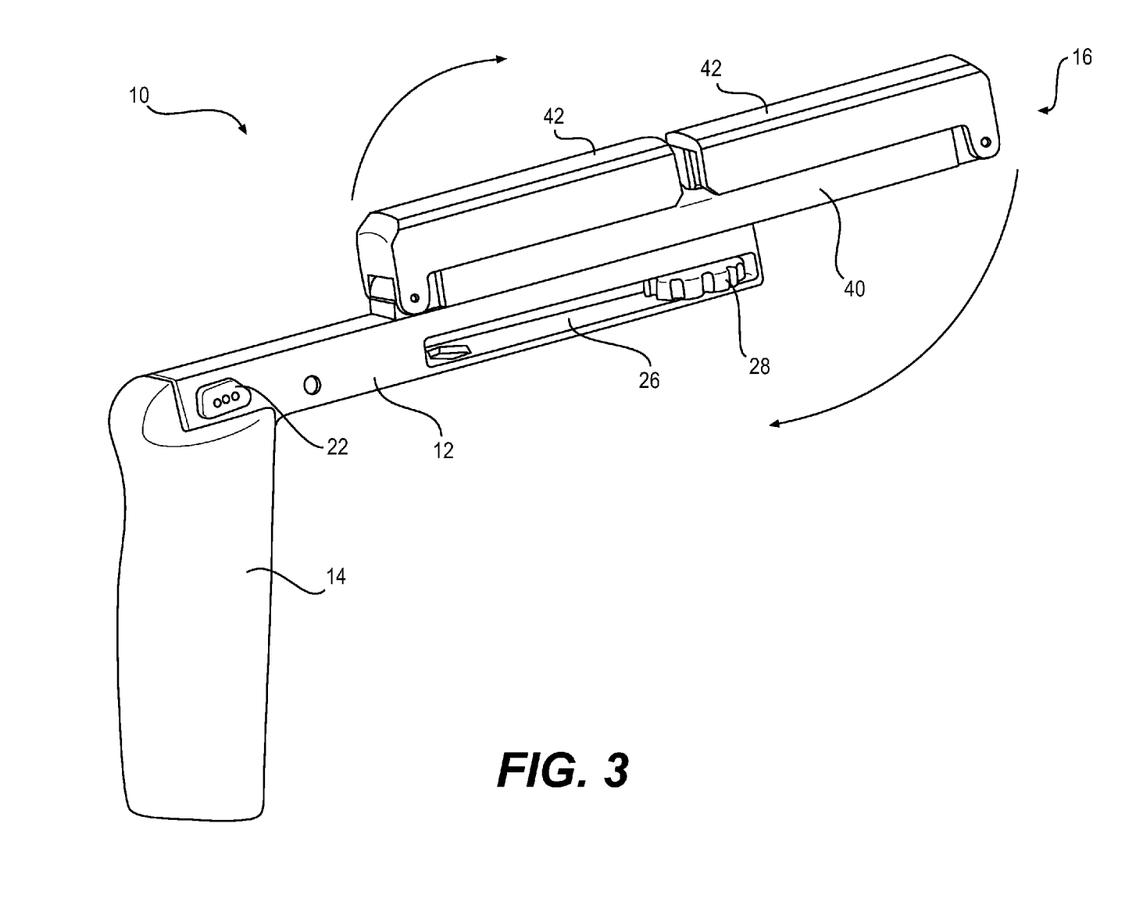
FIG. 3 is a perspective view of the holder of FIG. 1, showing the holder with the handle in the open position and the bracket partially open.
Figure 4:
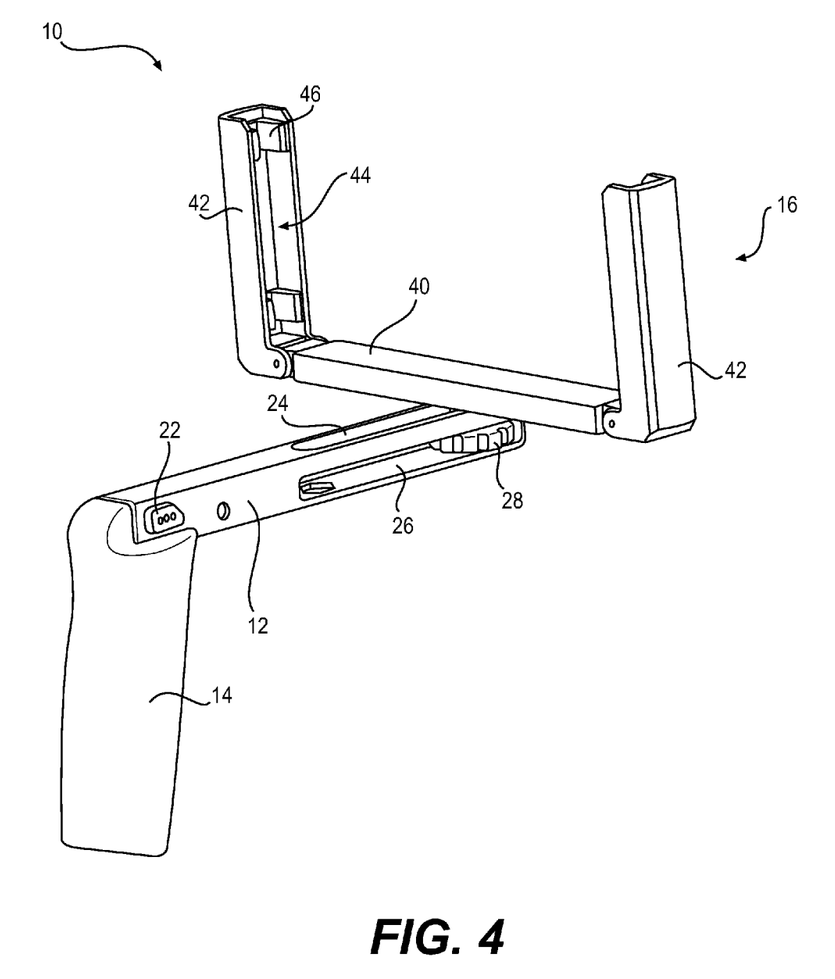
FIG. 4 is a perspective view of the holder of FIG. 1, showing the holder with the handle in the open position and the bracket in the open position.

Referring now to FIGS. 1-7, an electronic device holder 10 comprises an elongated main body 12, a handle affixed to the main body 14, and a U-shaped bracket 16 for holding an electronic device. The bracket 16 is selectively slidably and rotatably engaged with the main body. FIG. 1 shows the holder in a fully closed position, such as for transportation and storage, with the handle 14 in a closed position and the bracket 16 in a closed position. When in a closed position, the handle 14 is folded up against a lower surface of the main body 12, as illustrated. When in a closed position, the bracket 16 is parallel with the main body 12 and the arms 42 of the bracket 16 are folded down against and parallel with the lower portion 40 of the bracket 16. The thumbscrew (described further below) may be tightened to maintain the lower portion 40 of the bracket 16 in the position illustrated in FIG. 1.

In the illustrated embodiment, the handle 14 is affixed to the main body 12 adjacent one end of the main body (this end may be termed the proximal end, as it will be proximal to the user during use). Other positions for the handle on the main body may be used. In the illustrated embodiment, the handle 14 is hingedly affixed to the main body 12, such that the handle may be selectively movable between a closed position (shown in FIG. 1) and an open position (shown in FIG. 2). In alternative embodiments (not illustrated), the handle may be fixed and not foldable. In alternative embodiments (not illustrated), the handle may be removable from the main body. The holder may further comprise a latch to retain the handle in the open position and/or in the closed position. Any suitable latch mechanism may be used to hold the handle in its open and/or closed position. In the illustrated embodiment, the handle 14 is not held in the closed position by a latch or any other mechanism (although the hinge may be tight to help frictionally retain the handle in the closed position). A latch arm 20 engages with a latch shelf 21 formed in the main body 12 when the handle 14 is moved to the open position (shown in FIG. 2). The latch arm 20 is flexible, but inherently biased toward a latched position. A latch release button 22 pushes the latch arm 20 away from the latch shelf (or similar mechanism) when the latch release button 22 is pushed in, allowing the handle 14 to be folded into the closed position. The latch release button 22 is biased outward, typically with a spring. The handle 14 may be generally shaped like a pistol grip, as illustrated, although any suitable shape may be used.

Figure 5:
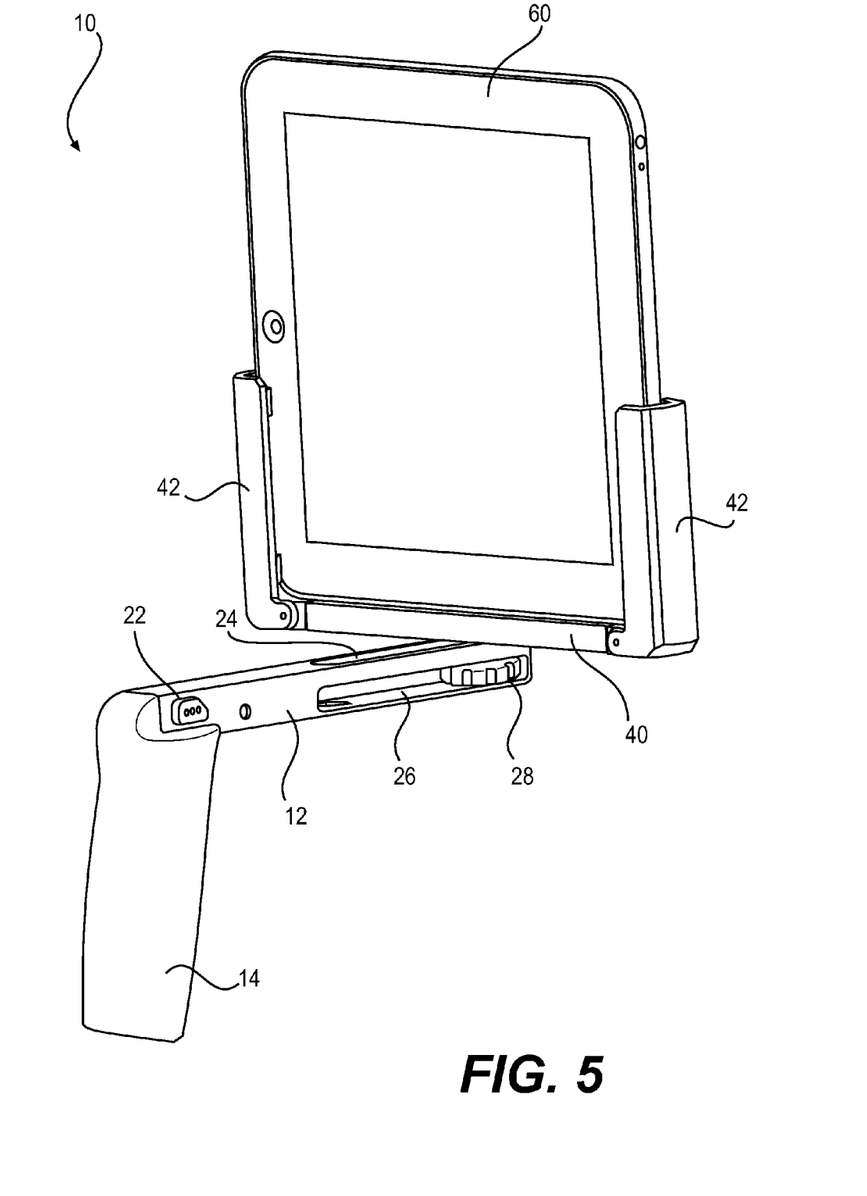
FIG. 5 is a perspective view of the holder of FIG. 1, shown holding an electronic device.
Figure 6:
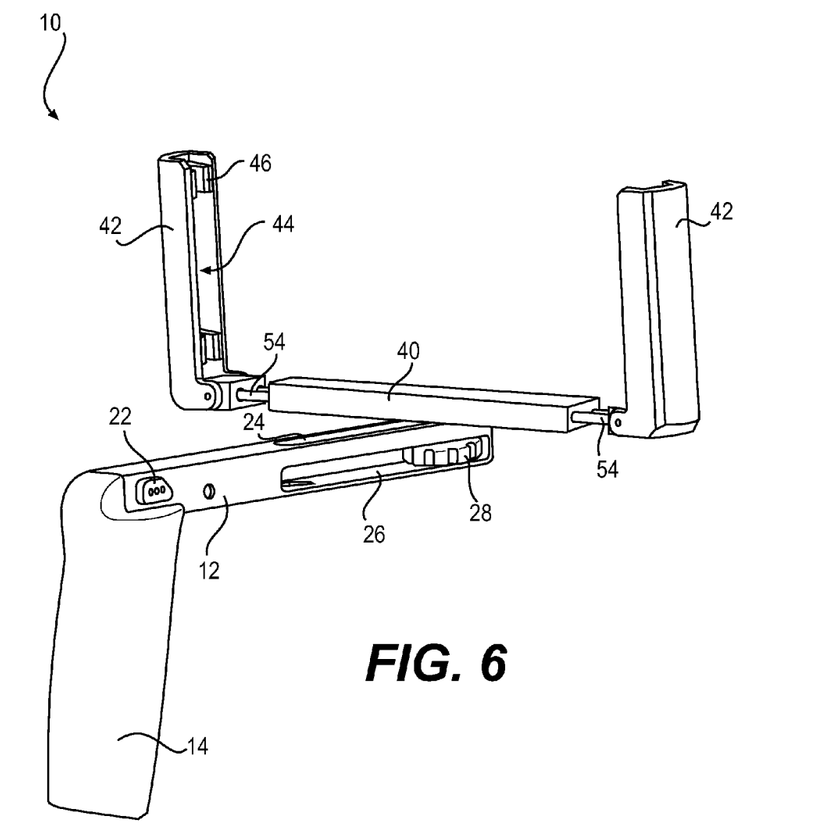
FIG. 6 is a perspective view of the holder of FIG. 1, showing the holder with the handle in the open position and the bracket in the open position and with its arms extended linearly outward to hold a larger electronic device.
Figure 8:
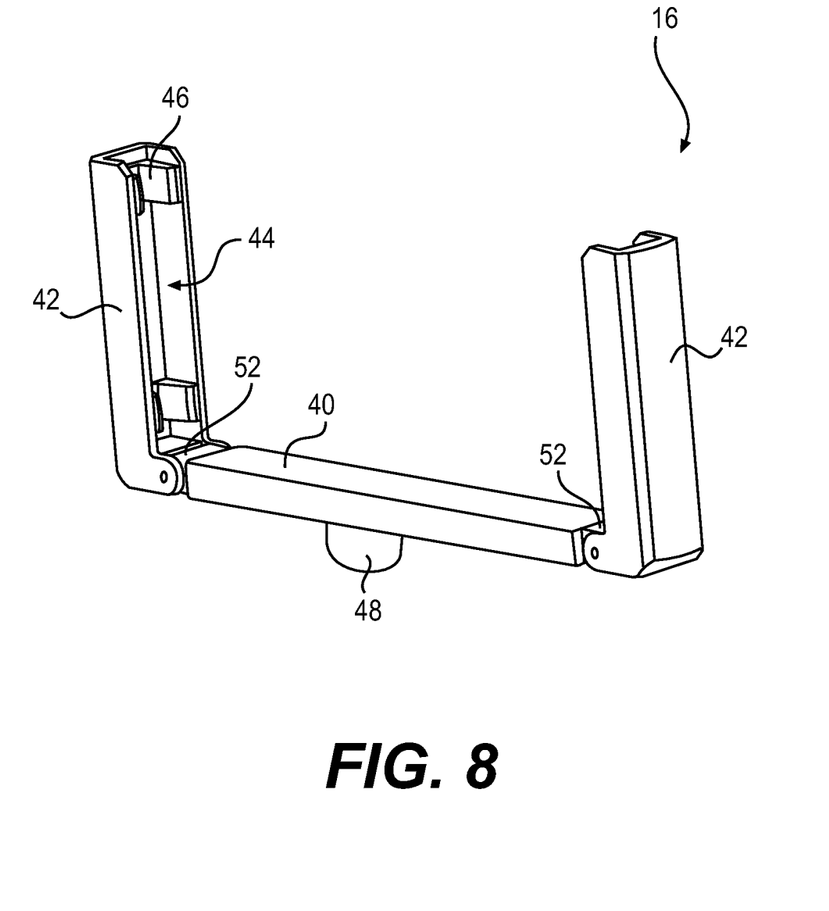
FIG. 8 is a perspective view of the bracket removed from the holder of FIG. 1, showing the bracket in the open position.

The bracket 16 comprises a lower portion 40 having first and second ends 52 and two arms 42. Each arm 42 is hingedly affixed to a respective one of the first and second ends 52. Each arm is generally U-shaped (although other shapes may be used), and the open side of each arm faces the open side of the other arm as seen in FIG. 8. In use, opposing side edges of an electronic device are placed in the U-shaped channels of the arms, and the bottom edge of the electronic device rests on the lower portion 40 of the bracket, as shown in FIG. 5. One or more cushions 46 may be positioned within each arm to help retain and protect the electronic device. Any suitable material may be used for the cushions 46, and it may be desirable to select a material such that there is a high coefficient of friction between the cushions and the electronic device to help retain the electronic device in the bracket. The bracket 16 further comprises a projection 48 on the bottom surface of the lower portion 40. The projection 48 has a female threaded opening 50 defined in a lower surface thereof. The projection 48 on the bottom surface of the lower portion 40 of the bracket 16 selectively slidably engages with the top channel 24, as described further below.

As shown and described, the bracket 16 is selectively slidable along at least a portion of a length of the main body 12. The bracket 16 is selectively rotatable at least between a first position that is parallel to the main body 12 and a second position that is perpendicular to the main body 12.

Figure 11:
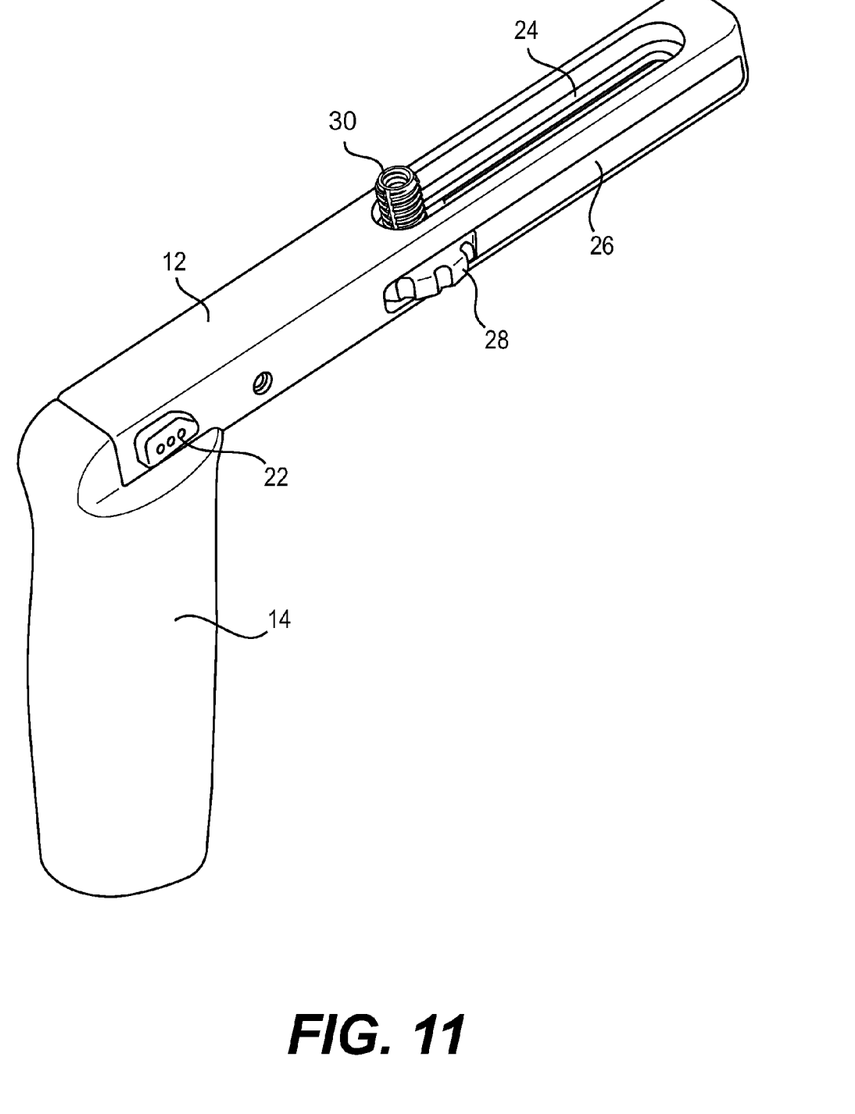
FIG. 11 is a perspective view of the holder of FIG. 1, with the bracket removed.

A top elongated open channel 24 is defined in a top surface of the main body 12. A side elongated open channel 26 is defined in the main body, and extends all the way through the main body from one side to the opposite side. The top channel 24 and the side through-channel 26 are at least partially open to each other, as seen in FIG. 11.

The holder 10 further comprises a thumbscrew 28 having a body (which may be knurled or otherwise contoured to enable a user to more easily grip and rotate the thumbscrew) and a male threaded projection 30. The thumbscrew 28 is at least partially positioned in the side through-channel 26 such that portions of the thumbscrew body project respectively out of opposing sides of the side through-channel (to enable a user to rotate the thumbscrew) and at least a portion of the male threaded projection 30 of the thumbscrew projects out of the top channel 24 (as seen in FIG. 11). The male threaded projection 30 of the thumbscrew may selectively threadedly engage the female threaded opening 50 of the projection 48 of the bracket 16 when the projection 48 of the bracket engages with the top channel 24. Tightening the threaded engagement between the male threaded projection 30 of the thumbscrew 28 and the female threaded opening 50 of the projection 48 of the bracket 16 can restrict movement of the bracket 16 relative to the main body 12.

The herein described steps for changing the holder from a closed position to an open position (or vice versa) do not need to be performed in any particular sequence. When a user desires to use the holder 10 to hold an electronic device, the user folds the handle 14 into the open position, shown in FIG. 2, in which position the handle latches. The user moves the bracket 16 from the closed position (shown in FIGS. 1 and 2) to the fully open position (shown in FIG. 4) by (in no particular order) (a) loosening the thumbscrew 28 (if it is tight), sliding the bracket 16 distally along the main body 12 as far as it will go (typically until the body of the thumbscrew hits the distal end of the main body or the male threaded projection 30 of the thumbscrew hits the distal end of the top channel) (shown in FIG. 3), (b) rotating the bracket 16 ninety degrees from being parallel to the main body (shown in FIGS. 1 and 2) to being perpendicular to the main body, (c) unfolding the bracket arms 42 from their closed position (shown in FIGS. 1-3) to their open position (shown in FIG. 4), and (d) tightening the thumbscrew 28 to lock the bracket 16 into the position shown in FIGS. 3 and 4 (the thumbscrew does not affect the arms 42). In their closed position, the bracket arms 42 are folded against and parallel to the lower portion 40 of the bracket 16. In their open position, the bracket arms 42 are perpendicular to the lower portion 40 of the bracket 16. When these steps have been performed, the holder 10 will be in the fully open position shown in FIG. 4 and ready to receive an electronic device.

While the bracket is described above as being rotated ninety degrees from being parallel to the main body (shown in FIGS. 1-3) to being perpendicular to the main body (shown in FIG. 4), it is possible to secure the bracket in a position that is angled other than ninety degrees to the main body. Although not illustrated, a swivel or tilt mechanism may be used in the attachment of the bracket to the main body, such that the bracket and electronic device can be tilted forward or backward to change the viewing angle.

Figure 7:
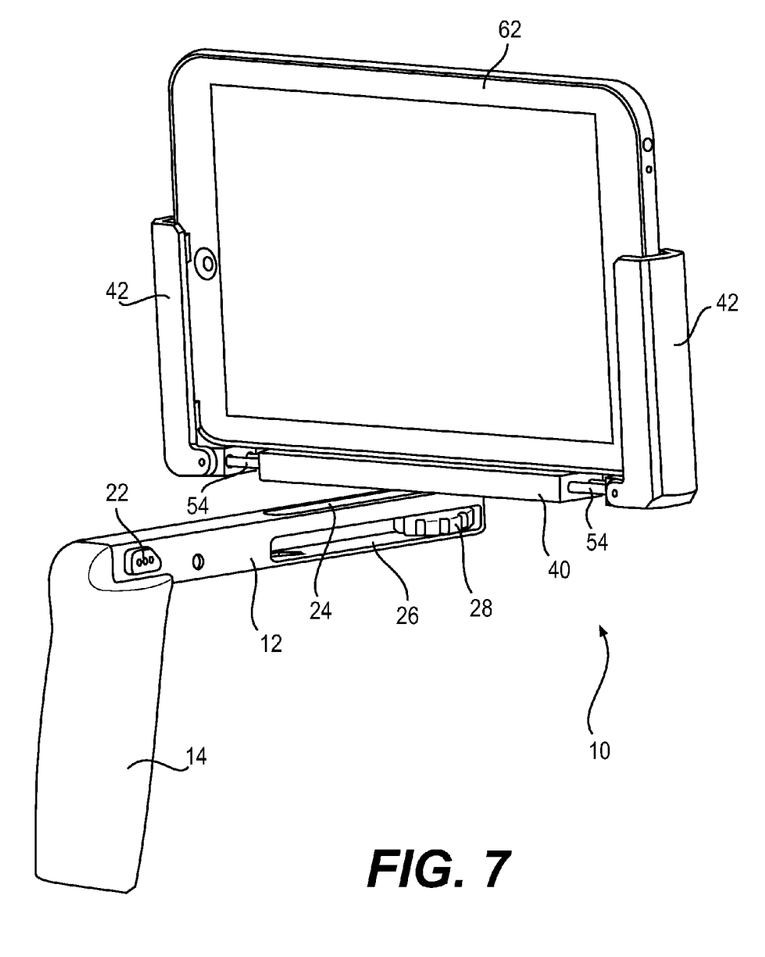
FIG. 7 is a perspective view of the holder of FIG. 1, shown holding a larger electronic device.

To accommodate larger electronic devices, the arms 42 may be selectively movable linearly in and out along a longitudinal axis of the lower portion of the bracket. Thus, the arms may be movable between an inward or medial position (shown in FIG. 4) and an outward or lateral position (shown in FIG. 6). When the arms are in the outward or lateral position, the greater distance between the arms accommodates a larger electronic device, as shown in FIG. 7. Typically (though not necessarily), the arms would be biased inward, toward each other along the longitudinal axis of the lower portion of the bracket, to help retain the electronic device.

Figure 10:
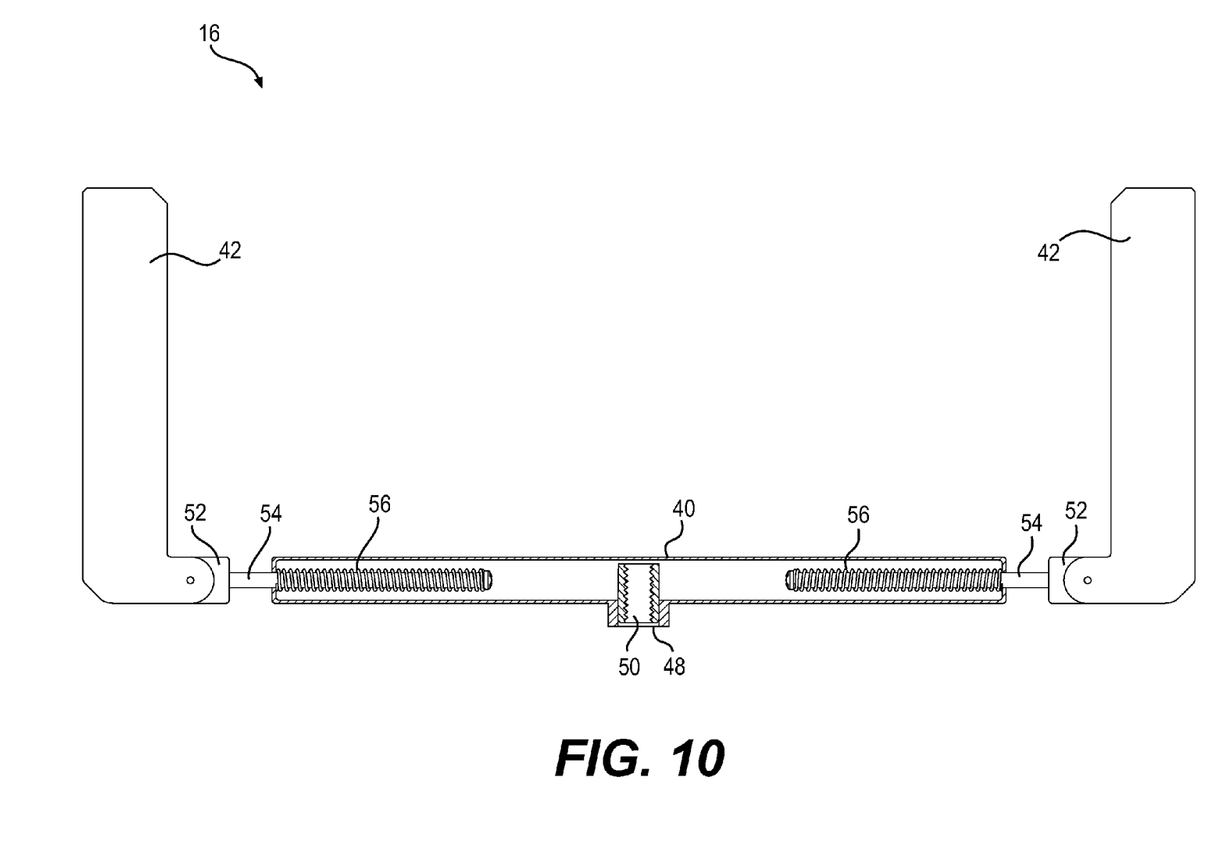
FIG. 10 is a partial cutaway front view of the bracket removed from the holder of FIG. 1.

Any suitable mechanism may be used to allow the arms to move linearly in and out and to bias the arms as described above. In the illustrated embodiment of the invention, the first and second ends 52 (to which the arms 42 are hingedly affixed) are movable independent of the center section of the lower portion 40 and are affixed to the elongated rods 54 that extend into the interior of the center section of the lower portion 40, as shown in FIG. 10. The rods 54 are slidably engaged with the center section of the lower portion 40, and are biased inward (medially) via springs 56. Thus, the arms are able to be manually moved outward by a user to accommodate a larger electronic device, and are biased inward to hold the arms against the electronic device and to return the arms to the position shown in FIG. 4 when no longer held outward. FIG. 7 illustrates a larger electronic device being held by the holder 10. In alternative embodiments of the invention (not illustrated), a rack and pinion mechanism may be used to allow the arms to move linearly in and out.

The size of the holder, the distance between the arms when the arms are in the fully inward position, and/or the distance the arms are able to move outward may be selected to accommodate two or more common sizes of electronic device. For example, the holder may be configured to hold a seven inch tablet computer when the arms are in the fully inward position and the arms may be able to move outward far enough to accommodate a nine inch tablet computer.

While embodiments of the invention are described herein having bracket arms that are selectively movable linearly in and out along a longitudinal axis of the lower portion of the bracket to accommodate different size electronic devices, alternative embodiments of the invention (not illustrated) may have a bracket with arms that are not adjustable to accommodate only a single width electronic device.

Any suitable mechanism may be used to allow the arms to move linearly in and out to accommodate different size electronic devices. In alternative embodiments of the invention (not illustrated), the arms may not be biased. Rather, the arms may be frictionally retained in the desired position. In such an embodiment, the arms would be pushed inward by a user against the sides of the electronic device and would maintain that position due to friction inherent in the adjustment mechanism.

By completely unscrewing the thumbscrew 28 from engagement with the female threaded opening 50 of the projection 48 of the bracket 16, the bracket 16 may be removed from the holder 10 as shown in FIG. 8. The female threaded opening 50 is sized to be selectively threadedly engageable with a standard male threaded tripod screw adapter. As such, the bracket 16 may be mounted to a standard tripod if desired.

Figure 9:
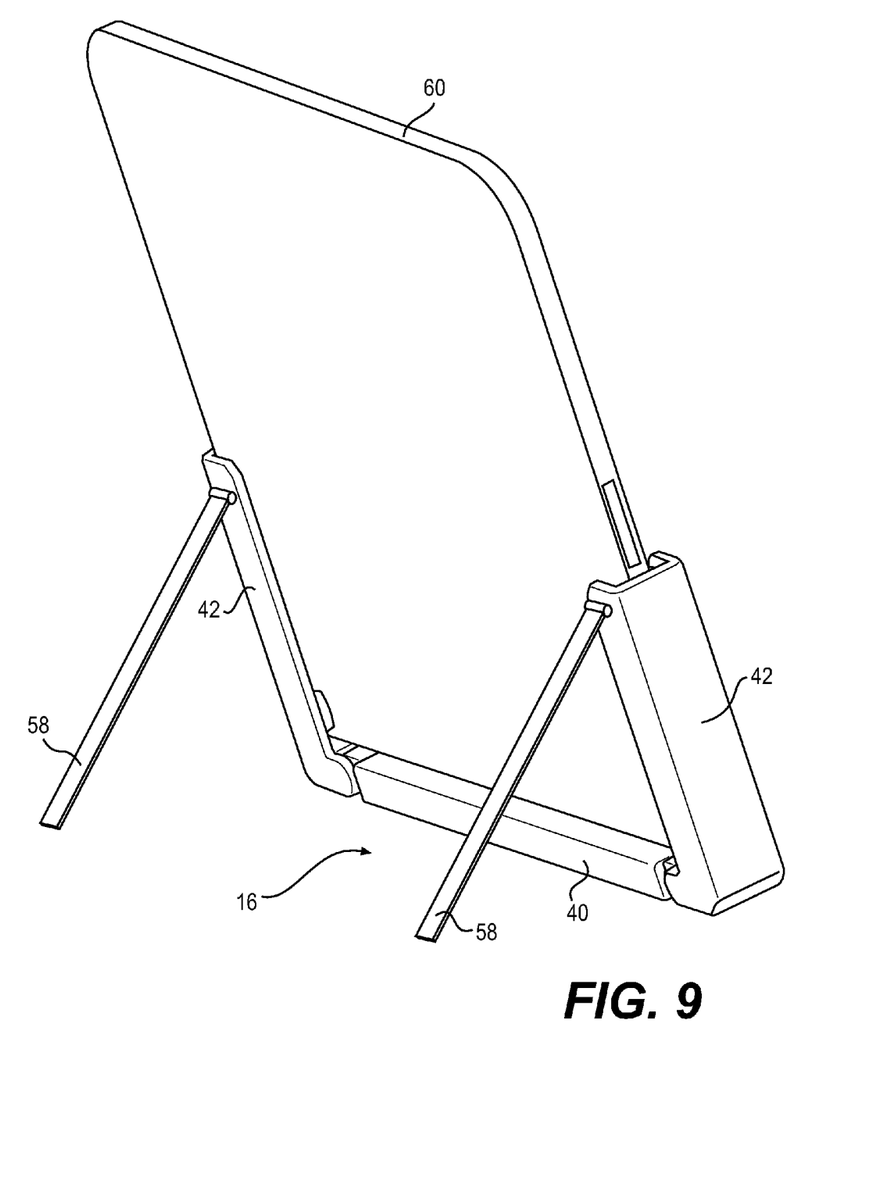
FIG. 9 is a perspective view of the bracket removed from the holder of FIG. 1, showing the bracket in the open position and supported by kickstands.

The bracket may further comprise one or more kickstands 58, as shown in FIG. 9. The kickstands may be affixed to the bracket in any suitable manner, but will typically be hingedly affixed. The kickstands are selectively movable between an open position in which each kickstand is folded out and away from the bracket (shown in FIG. 9) and a closed position in which each kickstand is folded in against its corresponding arm 42 (not shown). The one or more kickstands 58 support the bracket in an upright but angled position when the bracket is removed from the holder and when the one or more kickstands is in the open position, as shown in FIG. 9.

In alternative embodiments of the invention (not illustrated), a portion of the main body could telescope to enable the user to hold an electronic device further away from his/her body.

In alternative embodiments of the invention (not illustrated), the holder could have Bluetooth-enabled controls (or the like) to enable a user to control one or more functions of the electronic device (e.g., on/off and shutter) via the holder. Such controls may be, for example, on the handle. In alternative embodiments of the invention (not illustrated), the holder could have hardwired controls to enable a user to control one or more functions of the electronic device (e.g., on/off and shutter) via the holder.

The electronic device holder of embodiments of the invention may be constructed of any suitable material or combination of materials, such as plastic (any suitable plastic or combination of plastics), metal (any suitable metal or combination or metals), or combinations thereof.

In addition to the electronic device holder, as described above, other aspects of the present invention are directed to corresponding methods for holding an electronic device. After an electronic device is inserted between the arms of the holder, a user may view content on the device or record content to the device (e.g., video or photographs) several different ways. The holder may be held by the handle with the electronic device extended away from the user (and pointed toward whatever is to be recorded, if recording). In the same configuration (such as in FIG. 5), the holder and electronic device may be set down on a surface, such as a table. The bracket can be removed, as described above, and the bracket and electronic device may be set down on a surface, such as a table, using the kickstands to keep the holder and electronic device upright. The bracket can be removed, as described above, and the bracket and electronic device may be secured to a tripod which may be placed on any suitable surface, such as a floor or table.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of That which is claimed:

1. An electronic device holder comprising:
an elongated main body;
a handle affixed to the main body; and
a U-shaped bracket for holding an electronic device, the bracket being slidably and rotatably engaged with the main body such that the bracket is selectively slidable along at least a portion of a length of the main body and such that the bracket is selectively rotatable at least between a first position that is parallel to the main body and a second position that is perpendicular to the main body;
wherein the handle is hingedly affixed to the main body, such that the handle is selectively movable between an open position and a closed position.

2. The holder of claim 1, wherein the handle is affixed to the main body adjacent one end of the main body.

3. The holder of claim 1, wherein the holder further comprises a latch to retain the handle in the open position.

4. The holder of claim 1, wherein the bracket comprises a lower portion having first and second ends and two arms, each arm affixed to a respective one of the first and second ends.

5. The holder of claim 4, wherein said each arm is hingedly affixed to the respective one of the first and second ends.

6. The holder of claim 4, wherein said each arm is U-shaped with an open side; and wherein the open side of said each arm faces the open side of the other arm.

7. The holder of claim 4, wherein the arms are selectively movable linearly in and out along a longitudinal axis of the lower portion of the bracket.

8. The holder of claim 7, wherein the arms are biased inward along the longitudinal axis of the lower portion of the bracket.

9. The holder of claim 4, wherein the bracket further comprises a projection on a bottom surface of the lower portion, the projection having a female threaded opening defined in a lower surface thereof.

10. The holder of claim 9, wherein a top elongated open channel is defined in a top surface of the main body; wherein the projection on the bottom surface of the lower portion of the bracket selectively slidably engages with the top channel.

11. The holder of claim 10, further comprising a thumbscrew having a body and a male threaded projection from the main body;
wherein a side elongated through-channel is defined in the main body and extends from a first side of the main body to an opposing second side of the main body;
wherein the top channel and the side through-channel are at least partially open to each other;
wherein the thumbscrew is at least partially positioned in the side through-channel such that portions of the thumbscrew body project respectively out of opposing sides of the side through-channel and at least a portion of the male threaded projection projects into the top channel; and
wherein the male threaded projection of the thumbscrew selectively threadedly engages the female threaded opening of the projection of the bracket when the projection of the bracket engages with the top channel.

12. The holder of claim 11, wherein tightening the threaded engagement between the male threaded projection of the thumbscrew and the female threaded opening of the projection of the bracket restricts movement of the bracket relative to the main body.

13. The holder of claim 9, wherein the female threaded opening of the projection of the bracket is selectively threadedly engageable with a standard male threaded tripod screw adapter.

14. The holder of claim 1, wherein the bracket is selectively removable from the holder, wherein the bracket further comprises one or more kickstands selectively movable between an open position and a closed position, and wherein the one or more kickstands supports the bracket in an upright but angled position when the bracket is removed from the holder and when the one or more kickstands is in the open position.

15. An electronic device holder comprising:
an elongated main body;
a handle affixed to the main body; and
a U-shaped bracket for holding an electronic device, the bracket being slidably and rotatably engaged with the main body such that the bracket is selectively slidable along at least a portion of a length of the main body and such that the bracket is selectively rotatable at least between a first position that is parallel to the main body and a second position that is perpendicular to the main body;
wherein the bracket comprises a lower portion having first and second ends and two arms, each arm affixed to a respective one of the first and second ends; and
wherein said each arm is U-shaped with an open side; and wherein the open side of said each arm faces the open side of the other arm.

16. The holder of claim 15, wherein the handle is affixed to the main body adjacent one end of the main body.

17. The holder of claim 15, wherein the handle is hingedly affixed to the main body, such that the handle is selectively movable between an open position and a closed position.

18. The holder of claim 15, wherein the holder further comprises a latch to retain the handle in the open position.

19. The holder of claim 15, wherein said each arm is hingedly affixed to the respective one of the first and second ends.

20. The holder of claim 15, wherein the arms are selectively movable linearly in and out along a longitudinal axis of the lower portion of the bracket.

21. The holder of claim 20, wherein the arms are biased inward along the longitudinal axis of the lower portion of the bracket.

22. The holder of claim 15, wherein the bracket further comprises a projection on a bottom surface of the lower portion, the projection having a female threaded opening defined in a lower surface thereof.

23. The holder of claim 22, wherein a top elongated open channel is defined in a top surface of the main body; wherein the projection on the bottom surface of the lower portion of the bracket selectively slidably engages with the top channel.

24. The holder of claim 23, further comprising a thumbscrew having a body and a male threaded projection from the main body;
wherein a side elongated through-channel is defined in the main body and extends from a first side of the main body to an opposing second side of the main body;
wherein the top channel and the side through-channel are at least partially open to each other;
wherein the thumbscrew is at least partially positioned in the side through-channel such that portions of the thumbscrew body project respectively out of opposing sides of the side through-channel and at least a portion of the male threaded projection projects into the top channel; and wherein the male threaded projection of the thumbscrew selectively threadedly engages the female threaded opening of the projection of the bracket when the projection of the bracket engages with the top channel.

25. The holder of claim 24, wherein tightening the threaded engagement between the male threaded projection of the thumbscrew and the female threaded opening of the projection of the bracket restricts movement of the bracket relative to the main body.

26. The holder of claim 22, wherein the female threaded opening of the projection of the bracket is selectively threadedly engageable with a standard male threaded tripod screw adapter.

27. The holder of claim 15, wherein the bracket is selectively removable from the holder, wherein the bracket further comprises one or more kickstands selectively movable between an open position and a closed position, and wherein the one or more kickstands supports the bracket in an upright but angled position when the bracket is removed from the holder and when the one or more kickstands is in the open position.

28. An electronic device holder comprising:
an elongated main body;
a handle affixed to the main body; and
a U-shaped bracket for holding an electronic device, the bracket being slidably and rotatably engaged with the main body such that the bracket is selectively slidable along at least a portion of a length of the main body and such that the bracket is selectively rotatable at least between a first position that is parallel to the main body and a second position that is perpendicular to the main body;
wherein the bracket is selectively removable from the holder, wherein the bracket further comprises one or more kickstands selectively movable between an open position and a closed position, and wherein the one or more kickstands supports the bracket in an upright but angled position when the bracket is removed from the holder and when the one or more kickstands is in the open position.

29. The holder of claim 28, wherein the handle is affixed to the main body adjacent one end of the main body.

30. The holder of claim 28, wherein the handle is hingedly affixed to the main body, such that the handle is selectively movable between an open position and a closed position.

31. The holder of claim 30, wherein the holder further comprises a latch to retain the handle in the open position.

32. The holder of claim 28, wherein the bracket comprises a lower portion having first and second ends and two arms, each arm affixed to a respective one of the first and second ends.

33. The holder of claim 32, wherein said each arm is hingedly affixed to the respective one of the first and second ends.

34. The holder of claim 32, wherein said each arm is U-shaped with an open side; and wherein the open side of said each arm faces the open side of the other arm.

35. The holder of claim 32, wherein the arms are selectively movable linearly in and out along a longitudinal axis of the lower portion of the bracket.

36. The holder of claim 35, wherein the arms are biased inward along the longitudinal axis of the lower portion of the bracket.

37. The holder of claim 32, wherein the bracket further comprises a projection on a bottom surface of the lower portion, the projection having a female threaded opening defined in a lower surface thereof.

38. The holder of claim 37, wherein a top elongated open channel is defined in a top surface of the main body; wherein the projection on the bottom surface of the lower portion of the bracket selectively slidably engages with the top channel.

39. The holder of claim 38, further comprising a thumbscrew having a body and a male threaded projection from the main body;

wherein a side elongated through-channel is defined in the main body and extends from a first side of the main body to an opposing second side of the main body;

wherein the top channel and the side through-channel are at least partially open to each other;

wherein the thumbscrew is at least partially positioned in the side through-channel such that portions of the thumbscrew body project respectively out of opposing sides of the side through-channel and at least a portion of the male threaded projection projects into the top channel; and wherein the male threaded projection of the thumbscrew selectively threadedly engages the female threaded opening of the projection of the bracket when the projection of the bracket engages with the top channel.

40. The holder of claim 39, wherein tightening the threaded engagement between the male threaded projection of the thumbscrew and the female threaded opening of the projection of the bracket restricts movement of the bracket relative to the main body.

41. The holder of claim 37, wherein the female threaded opening of the projection of the bracket is selectively threadedly engageable with a standard male threaded tripod screw adapter.

* * * * *